May 14, 1940.　　　A. W. HAMON　　　2,201,088
MECHANICAL PITCHFORK
Filed May 11, 1939　　　2 Sheets-Sheet 1

Inventor
Albert W. Hamon

May 14, 1940.　　　A. W. HAMON　　　2,201,088
MECHANICAL PITCHFORK
Filed May 11, 1939　　2 Sheets-Sheet 2
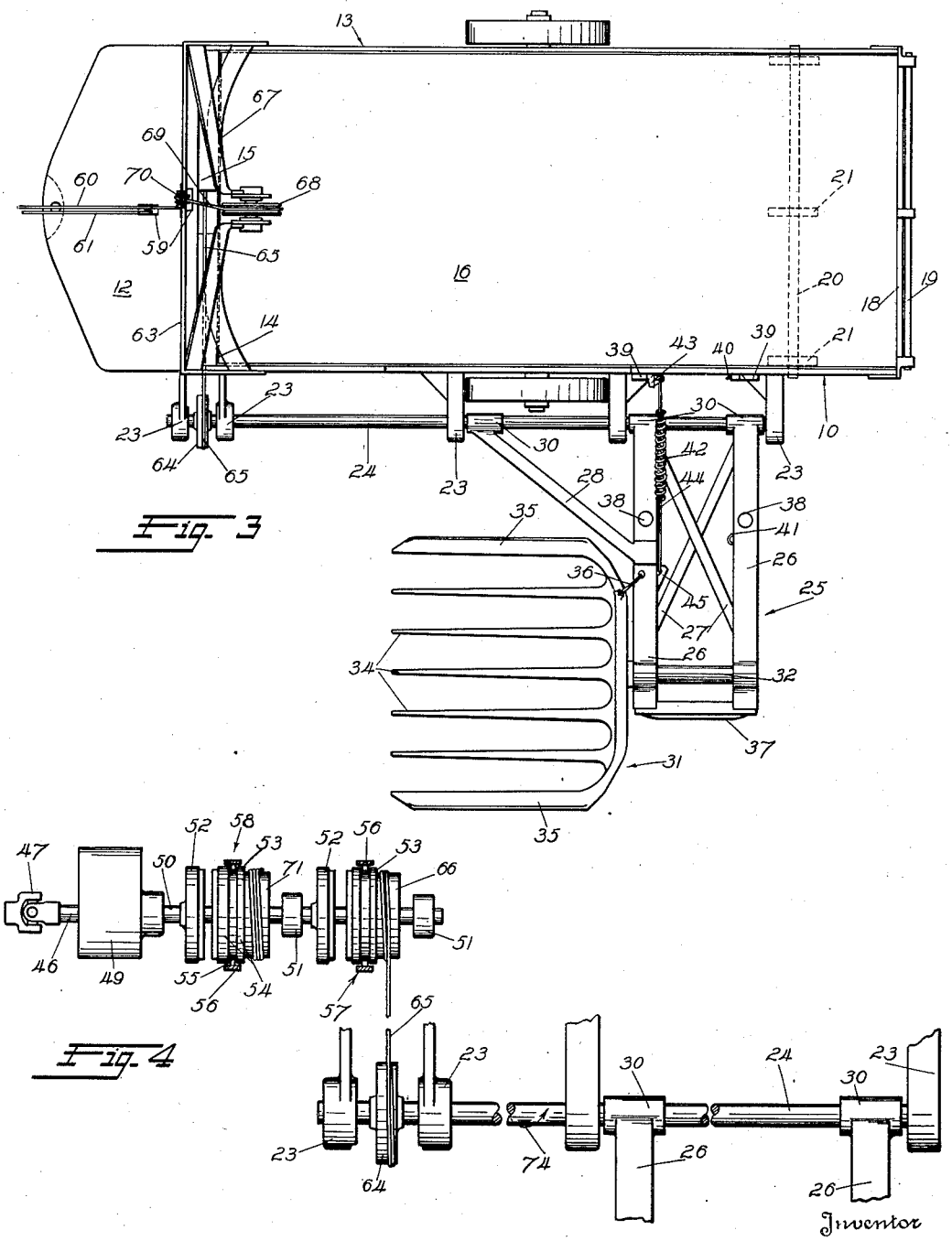
Inventor
Albert W. Hamon
By L. F. Randolph
Attorney Patented May 14, 1940

2,201,088

UNITED STATES PATENT OFFICE 2,201,088

MECHANICAL PITCHFORK

Albert W. Hamon, Skedee, Okla.

Application May 11, 1939, Serial No. 273,109

9 Claims. (Cl. 214—80)

This invention relates to an improved attachment for wheeled vehicles for mechanically loading and unloading a vehicle.

More particularly, it is an aim of this invention to provide an attachment adapted to be connected to a wheeled vehicle, such as a farm wagon or truck, and including a power take-off shaft having a manually controlled clutch for actuating a second shaft for operating a fork for loading the body of the vehicle.

Still a further aim of the invention is to provide a second manually operated clutch for actuating the pivotally mounted bottom of said vehicle for dumping the load therefrom.

More particularly, it is an object of this invention to provide an improved loading fork adapted to normally rest on the ground and provided with a limited swivel movement whereby the fork head may turn to accommodate itself to any unevenness in the ground level.

Other objects and advantages of the invention will hereinafter become more fully apparent from the following description of the drawings, which illustrate a preferred embodiment thereof, and wherein—

Figure 1:
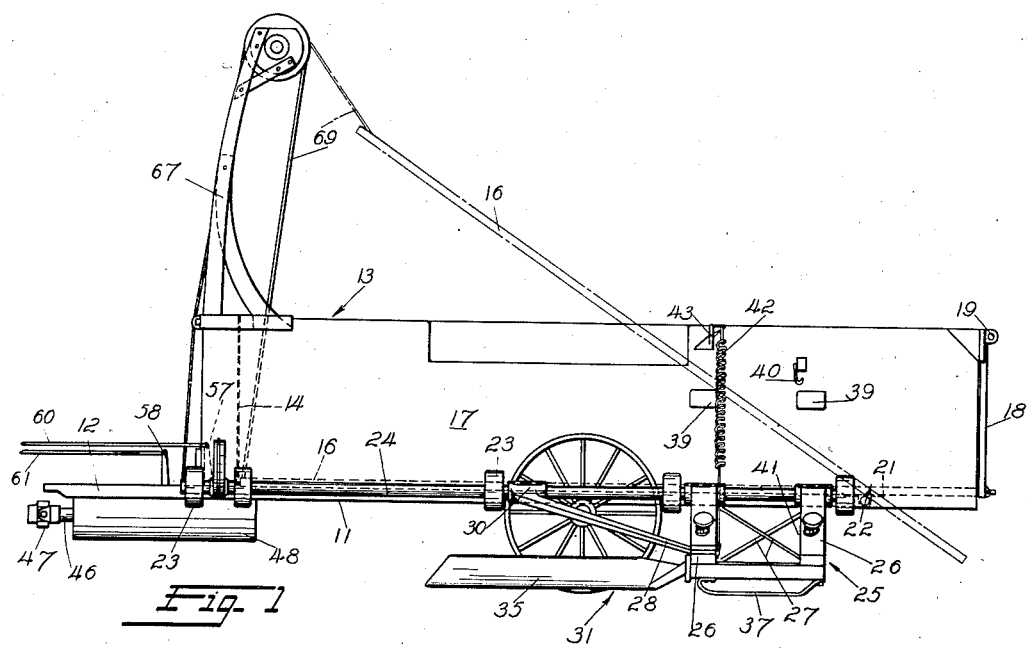
Figure 2:
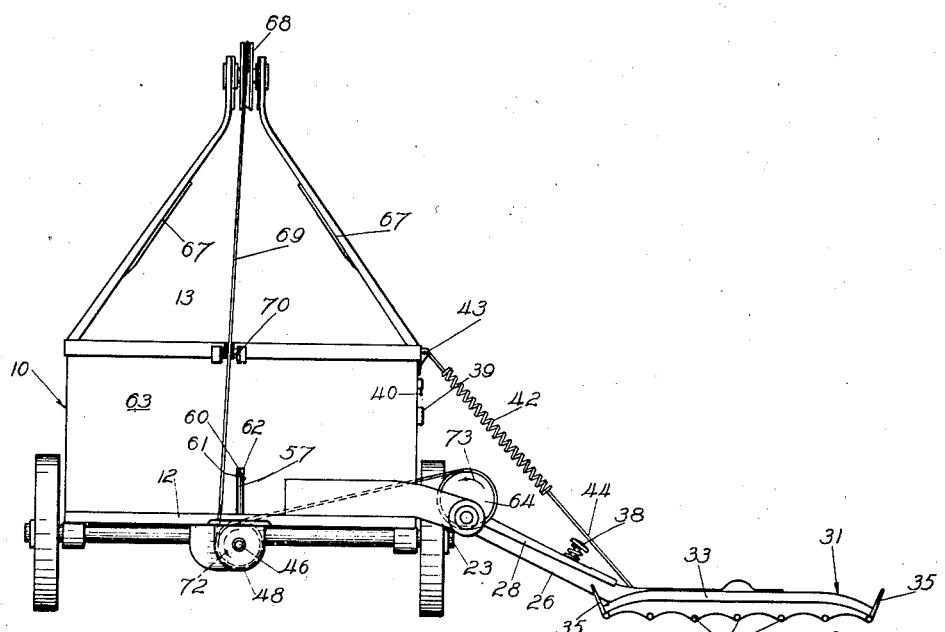

Figure 1 is a side elevational view showing a trailer equipped with the mechanical loading and unloading attachment, Figure 2 is a front elevational view of the same, Figure 3 is a top plan view of the same, and Figure 4 is a fragmentary top plan view, partly in section, showing the operating mechanism of the invention.

Referring more particularly to the drawings, wherein like reference characters designate like or corresponding parts throughout, 10 designates generally a vehicle of the trailer type including a chassis 11 having a tongue 12 at the forward end thereof and provided with a body, designated generally 13, the front wall 14 of which is spaced from the tongue 12 forming a slot 15 therebetween. Body 13 includes in addition to the front wall 14, the bottom 16, side walls 17 and a tail gate 18 which is hinged at its top by means of the rod 19 to open upwardly and outwardly. Bottom 16 is pivotally mounted adjacent its rear end in the body 13 by means of the rod 20 which is disposed transversely thereof and secured thereto, as by means of the strap fastenings 21. The ends of the rod 20 are journaled in bearings formed in the depending portions 22 of the sides 17, as best seen in Figure 1.

A plurality of spaced bearing members 23 are secured to and project outwardly from a side of the vehicle 10 to journal a shaft 24 which extends longitudinally of the vehicle 10 and which is spaced therefrom, as best seen in Figure 3. A frame 25 includes the corresponding arms 26, connected by the diagonal braces 27 and a diagonal brace 28, connected at one end to one of the arms 26, is adapted to be fixed to the shaft 24 by means of the sleeves 30 formed on the corresponding ends of the arms 26 and brace 28, which engage and are secured to the shaft 24. A fork head 31 is provided with a shank 32, which is journaled adjacent the outer ends of the arms 26 to swivelly mount the fork 31 relatively to the frame 25. Fork 31, as best seen in Figures 2 and 3, includes a relatively wide back 33 from the bottom edge of which project the tines 34. The two outer tines 34 are provided with the upwardly diverging flanges 35 which connect with the back 33, for a purpose which will hereinafter be described. A flexible fastening 36, such as a chain, connects one of the arms 26 to the fork 31 adjacent one end of its back 33 and is provided with sufficient slack to provide a limited swivel movement of the fork 31 relatively to the frame 25. As best seen in Figure 1, frame 25 at its outer free end is provided with a depending skid shoe 37 disposed slightly below the level of the lower edges of the tines 34. The frame 25 is provided with bumpers 38 each including a headed rod slidably mounted in one of the arms 26 and having an expansion spring disposed between the arm 26 and the head of the rod for normally holding the rod in a projected position. Bumpers 38 are adapted to engage the abutment members 39 mounted on one of the sides 17 for limiting the upward swing of the frame 25.

Frame 25 may be held in a raised, inoperative position when not in use, by attaching the hook 40 which is loosely connected to the same side 17 to an eyelet 41 on the frame 25 to hold the fork 31 in an elevated position. A contractile coil spring 42 is connected at one end to a bracket 43 secured to the same side 17 and is loosely connected at its opposite end to a rod 44, the opposite end of which is pivotally connected to the lug 45 of the frame 25. Spring 42 is adapted to check the downward swing of the frame 25 and fork 31, as will hereinafter be more fully described.

The trailer vehicle 10 is adapted to be connected to a tractor or other suitable draft vehicle, not shown, and a power take-off shaft 46, provided with the universal joint at 47 is adapted to be connected to the drive shaft of the tractor in any suitable manner, not shown. The shaft 46 extends into the casing 48 mounted beneath the tongue 12 and the forward end of the chassis 11.

Casing 48 contains a housing 49 provided with reduction gears, not shown, for connecting the shaft 46 to a shaft 50 for driving the last mentioned shaft at a reduced speed. The shaft 50, seen in Figure 4, is journaled in the bearings 51 and is provided with the spaced corresponding clutch elements 52, which are fixed to the shaft 50. A second pair of clutch elements 53 are loosely mounted on the shaft 50, on corresponding sides of the clutch elements 52. Elements 53 are provided with the spaced annular ribs 54 to receive the inwardly projecting lugs 55 of the corresponding forked ends 56 of the levers 57 and 58, which as seen in Figure 3 extend upwardly through the slots 59 in the tongue 12. The levers 57 and 58 are pivotally connected intermediate of their ends, not shown, to the tongue 12, and are provided at their upper ends with the forwardly projecting rods 60 and 61, respectively, which extend forwardly to the driver's seat of the tractor, not shown, and which are adapted to be manually actuated by means of levers, not shown, for rocking the levers 57 and 58 to move the clutch elements 53 into and out of engagement with the clutch elements 52. Rod 60 extends through a slot 62 in a front wall 63 of the vehicle 10 which projects upwardly from the tongue 12 and which is disposed in front of and spaced from the front wall 14 of the body 13.

A pulley 64 is eccentrically fixed to the shaft 24 adjacent its forward end, and a cable 65 is secured at one end to the pulley 64 and wound one or more times around said pulley with the opposite end of said cable fixed to the windlass portion 66 of the rear clutch element 53 and wound one or more times around the windlass 66.

A hoist comprising a pair of standards 67 and an idler pulley 68 is mounted above the forward end of the body 13. Standards 67 are secured to the forward ends of the sides 17 and to the ends of the front wall 63 and project upwardly and inwardly therefrom to journal the pulley 68 between their converging ends. A cable 69 is secured at one end to the forward end of the bottom 16 and is trained over the pulley 68 and over a pulley 70, mounted on the wall 63, with its opposite end wound several times around the windlass portion 71 of the forward clutch element 53.

From the foregoing it will be seen, that when the trailer vehicle 10 is connected to a tractor or other draft vehicle with its shaft 46 connected to the drive shaft of said draft vehicle, that the trailer 10 will not only be drawn by the draft vehicle but the shaft 46 will be revolved by the drive shaft of the draft vehicle to turn shaft 50 at a reduced speed to revolve the clutch elements 52. The vehicle 10 is adapted to be drawn through a field for the purpose of picking up bound or loose grain on the fork 31 which is adapted to travel along the ground, in a position as seen in Figures 1 and 2. When the fork 31 is loaded the operator of the tractor actuates rod 60 to cause it to move rearwardly to rock lever 57, which is connected to the rear clutch element 53, containing the windlass 66, to move said element forwardly and into frictional engagement with the rear clutch element 52 to cause said clutch element 53 to be revolved in the direction as indicated by the arrow 72, in Figure 2, to exert a pull on cable 65 to thereby turn pulley 64 and shaft 24 in the direction as indicated by the arrows, designated 73 and 74, respectively, of Figures 2 and 4. This counterclockwise movement of the shaft 24 will swing the frame 25 upwardly and inwardly to throw the grain held by the fork 31 into the body 13. At approximately the time that the resilient abutments 38 strike the abutment surfaces 39 the grain will be released and thrown into the body 13. The operator of the tractor then pulls rod 60 forwardly to move the clutch element 53 out of engagement with the clutch element 52 so that the weight of the frame 25 and the fork 31 can cause these parts to swing back to their horizontal position, which is resisted by the spring 42 to prevent the skid shoe 37 from striking the ground with too much force. It will be noted that the pulley 64 extends upwardly from the shaft 24 when the fork 31 is in its horizontal or lowered position. Because of this, as the pulley 64 swings toward the shaft 50, during the upward movement of the fork 31, the speed of the shaft 24 relatively to the shaft 50 will be increased thus increasing the momentum of the fork 31, during its upward movement, as it moves toward the body 13 so that the grain will be effectively thrown therefrom as abutments 38 engage abutments 39. The upwardly extending back 33 and the upwardly extending flanges 35 function to prevent the grain from slipping off of the fork 31. Skid shoe 37 holds the tines 34 slightly raised so that they will not dig into the earth, and the flexible connection 36 permits the fork 31 to swivel sufficiently to accommodate itself to the level of the ground surface over which it is passing. After the truck body 13 has been loaded or while moving to or from the field, fork 31 can be held in a raised inoperative position by connecting hook 40 to eyelet 41.

In order to dump the load in the body 13, rod 61 is moved rearwardly by the operator of the draft vehicle to rock the lever 58 to thereby move the forward clutch member 53 into engagement with its clutch element 52 to turn said clutch element 53 in the direction as indicated by the arrow 72 thereby causing cable 69 to be wound onto the windlass 71 thus exerting a pull on said cable to raise the forward end of the bottom 16 to its dotted line position, as seen in Figure 1, so that the grain in the body 13 will be dumped from the rear end of said bottom. By pulling forwardly on rod 61 the forward clutch element 53 will be moved rearwardly and out of engagement with its clutch element 52 thus being released to allow the weight of the forward end of the bottom 16 to return it to its normal horizontal position, as seen in Figure 3.

Various modifications and changes in the construction and arrangement of the parts forming the invention are contemplated and may be resorted to, and the right is expressly reserved to make such variations as fall within the spirit and scope of the invention as hereinafter defined by the appended claims.

I claim as my invention:

1. A device of the class described comprising a trailer vehicle, power take-off means mounted thereon and disposed longitudinally thereof, a rotatably mounted shaft disposed substantially parallel to the power take-off means, means connecting said shaft and said power take-off means, said means including a clutch, a frame fixed to said shaft and projecting outwardly of one side of said vehicle, and a pitchfork connected to the outer end of said frame and movable by the rotation of said shaft through an arc toward the trailer vehicle.

2. A mechanical pitchfork comprising a trailer vehicle, a shaft journaled along one side thereof, a frame fixed to and projecting outwardly from said shaft, a pitchfork connected to the outer end of said frame and projecting forwardly therefrom, power take-off means connected to said shaft for swinging the pitchfork toward the body of the trailer vehicle, and spring abutment means carried by the frame for engaging the trailer body.

3. A device as in claim 2, said power take-off means including a manually actuated clutch for engaging and disengaging the shaft and power take-off means, and contractile spring means for resisting the movement of the pitchfork away from the trailer.

4. A device as in claim 2, said pitchfork being swively connected to said frame whereby it can rock freely relatively to the frame when in a lowered position, and means for limiting the swivel movement of said fork relatively to the frame.

5. A vehicle loading device comprising a trailer vehicle, a shaft journaled on one side thereof, arms fixed to and projecting outwardly from said shaft, a fork swively connected to the free ends of said arms, a driven shaft journaled beneath said trailer, a clutch element fixed to said driven shaft, a second clutch element loosely mounted on said driven shaft and including a windlass drum, manually operated means for moving said second clutch element into and out of frictional engagement with said first mentioned clutch element, a pulley eccentrically connected to said first mentioned shaft, a belt connecting the windlass and pulley for actuating the first mentioned shaft for swinging the fork upwardly and toward the body of the trailer vehicle, and spring means for restricting the movement of said fork away from the trailer vehicle.

6. A device as in claim 5, and spring abutment means associated with said arms and adapted to engage fixed abutment members on the body of said trailer vehicle.

7. A loading and unloading attachment for vehicles comprising a wheeled vehicle having a body provided with a bottom pivotally mounted adjacent the rear end thereof, a driven shaft journaled on said vehicle longitudinally thereof, said shaft having a pair of spaced corresponding clutch elements fixed thereto, a pair of corresponding clutch elements loosely mounted on said shaft and including windlass drums, means for selectively actuating said last mentioned clutch elements for moving them into and out of frictional engagement with said first mentioned clutch elements, a derick provided with an idler pulley disposed above the forward end of said body and mounted thereon, a cable having one end connected to the forward end of said bottom, said cable being trained over said pulley and having its opposite end fixed to and partially wound on one of said windlass drums, a shaft rotatably mounted at one side of said vehicle body, arms fixed to and projecting outwardly from said last mentioned shaft, a fork swively connected to the outer ends of said arms and projecting forwardly therefrom, and a belt connecting said last mentioned shaft to the other windlass drum for turning the shaft to swing said fork upwardly and toward the vehicle body.

8. A vehicle loading device comprising a shaft journaled along a side of the body of a vehicle, an arm fixed to said shaft and projecting outwardly therefrom, a fork, means connecting said fork to the free end of the arm to provide a limited swivel movement of the fork relatively to the arm, a driven shaft carried by said vehicle, means for connecting said driven shaft to said first mentioned shaft for swinging the arm and fork upwardly and toward the vehicle body, and resilient means for resisting the movement of the arm and fork away from the body.

9. A device as in claim 8, comprising spring abutment members carried by said arm for yieldably engaging a portion of the vehicle body when said arm is in a raised position.

ALBERT W. HAMON.